US007134357B2

(12) United States Patent
Gilbert et al.

(10) Patent No.: US 7,134,357 B2
(45) Date of Patent: Nov. 14, 2006

(54) ROTATION LIMITER

(76) Inventors: Micky G Gilbert, 5733 Secrest Ct., Golden, CO (US) 80403; John O Olmstead, 5733 Secrest Ct., Golden, CO (US) 80403

( * ) Notice: Subject to any disclaimer, the term of this patent is extended or adjusted under 35 U.S.C. 154(b) by 427 days.

(21) Appl. No.: 10/604,307

(22) Filed: Jul. 9, 2003

(65) Prior Publication Data

US 2005/0005727 A1 Jan. 13, 2005

(51) Int. Cl.
*B62D 1/16* (2006.01)

(52) U.S. Cl. ............................ 74/492; 74/493; 74/526; 74/504

(58) Field of Classification Search .................. 74/492, 74/493, 496, 504, 511 R, 527, 813 R, 816, 74/414, 4; 192/138, 139, 148; 280/89, 779
See application file for complete search history.

(56) References Cited

U.S. PATENT DOCUMENTS 2,588,017 A * 3/1952 Last ............................ 74/414
2,744,416 A 5/1956 Feigin ......................... 74/414
2,746,573 A 5/1956 Hastings ..................... 74/10.2
3,012,447 A * 12/1961 Wallace ........................ 74/526
3,055,235 A 9/1962 Turley ......................... 475/14
3,147,629 A * 9/1964 Michalec .................... 74/10.2
3,795,122 A * 3/1974 Lipschutz .................... 70/182
4,191,301 A * 3/1980 Hickman et al. ........... 212/223
4,751,986 A 6/1988 Takahashi .................... 188/85
4,794,814 A * 1/1989 Ferguson, Jr. ................ 74/526
5,239,490 A 8/1993 Masaki et al. ................ 702/41
5,600,979 A * 2/1997 Winner et al. ................ 70/252

* cited by examiner

*Primary Examiner*—Richard Ridley
*Assistant Examiner*—Justin Krause
(74) *Attorney, Agent, or Firm*—Kyle W. Rost

(57) ABSTRACT

Adjustable stops are mounted on a rotating rod, and one pivot arm of a linked pair extends into an interference position such that one stop will strike it. The linkage draws the second arm into interference position if the first arm is displaced from it. Each pivot arm will brake the stop if struck from one direction and will be displaced, drawing in the other pivot arm, if struck from the opposite direction. The pivot arms react oppositely to being struck from each respective direction of rotation. Thus, continued rotation of the rod in one direction results in a stop striking a pivot arm suitably to brake the stop, with the permitted arc of rotation determined by relative adjustment of the stops.

22 Claims, 3 Drawing Sheets

ROTATION LIMITER

BACKGROUND OF INVENTION

1. Field of the Invention

The invention generally relates to brakes. More specifically, the invention relates to rod or wheel brake, especially to an intermittent brake. A positive lock brake is applied to a rotating rod, such as to an automotive steering wheel shaft. The mechanism permits the shaft to rotate through a limited, preselected arc. At the end of the preselected arc, the mechanism applies a positive lock in the direction of rotation. A mechanism of this type is useful in conducting dynamic testing of vehicle performance.

2. Description of Related Art Including Information Disclosed Under 37 CFR 1.97 and 1.98

Evaluating the performance characteristics of a car, truck, other land vehicle, or water vehicle can require performing repeated dynamic evaluations. Often such testing requires that an expert test driver perform a defined maneuver, and such a maneuver may be repeated a plurality of times under similar or controlled conditions. In order to aid the test driver in accurately repeating a test, it is desirable to limit certain aspects of vehicle performance. These limitations may include, for example, speed and available degree of steering wheel rotation. Every vehicle has inherent maximum limits for these factors; but for testing purposes, it is desirable to apply limits other than inherent maximums. As one example, for accident reconstruction it may be desirable to drive the vehicle under conditions similar to those present at the time of the accident.

One desirable limitation in such evaluations is the permitted arc of rotation for the steering wheel. Only in the unusual case is maximum available arc of steering rotation to be used in an evaluation. Typically, a test will require a preselected arc of steering wheel rotation less than the maximum. This arc often is less than two turns from neutral wheel position. Because the arc may be more than one full revolution, a simple abutment stop cannot be used in every situation.

Computerized steering systems can control and repeat any specified pattern of steering wheel rotation. Such systems cannot be used in every case. A computerized system often is designed for use with only a specific vehicle or type of vehicle. When evaluating a specific vehicle that has been involved in an accident, it may be impractical or impossible to find and install a computerized system suitable for use with the selected vehicle. Further, computerized steering systems tend to be technically complex and correspondingly costly, which serves as a practical prohibition against using them in many testing situations.

It would be desirable to have a widely adaptable steering limiter that can be simply and readily installed on a test vehicle. Further, it would be desirable to have a steering limiter of this type that is adjustable to permit a variably selectable angle of maximum steering wheel rotation.

Various devices appear in United States patents for limiting rotation of a wheel or shaft.

U.S. Pat. No. 4,751,986 to Takahashi shows a rotor that is provided with a stop. An arcuate stator is spaced from the rotor and carries two stops, spaced apart by a specified angle. A ball circulates in the gap between the rotor and stator and between the two stops of the stator. The rotor can rotate in either direction. The rotor stops when the stop on the rotor has pushed the ball against either of the stops on the stator. From one extreme to another, the rotor can rotate between one and two rotations. This system could offer an ability to control available rotation either by starting the ball in a predefined starting position between the stops or by adjusting a spacing between the two stops on the stator. However, this system is not readily adapted to be installed on any selected vehicle. Further, adjustment requires considerable pre-fabrication and complexity.

U.S. Pat. No. 4,191,301 to Hickman et al. shows a rotating main shaft that carries an extending lug. On each revolution, the lug strikes a boss on a neighboring counting wheel, advancing the wheel by a partial turn. One of the bosses on the counting wheel eventually will reach and contact a fixed stop lug that prevents further turning of the counting wheel. This stop event also prevents further rotation of the main shaft in the initial direction. The number of bosses on the counting wheel determines how many times the shaft can rotate in one direction before the stop event. As taught in the patent, this system offers no fine adjustment of less than one turn of the main shaft. A possible, but untaught, modification to increase fine adjustment is to provide multiple extending lugs on the shaft to reach the stop point after one or more partial turns. However, this type of adjustability requires specific pre-fabrication to conform to each different degree of desired steering wheel rotation. Thus, this system is not well suited for variable testing.

U.S. Pat. No. 2,746,573 to Hastings shows a two-sided system for allowing more than one turn between the two sides of the system. One side of the system is a spiral spring that provides a spiral groove pathway between the spring walls. The second side of the system provides a follower block that is slidable on a radial pathway. As the two sides relatively rotate, the follower block moves radially in the spring grooves until it reaches a stop at either end of the pathway. It is not evident how this system could be applied to a pre-installed steering shaft and variably adjusted for a selected degree of wheel angle.

U.S. Pat. No. 2,744,416 to Feigin shows a system of fixed stops on two meshing gears with different numbers of teeth. Due to differential gear ratios, after a determinable number of rotations, the fixed stop on each gear meets the fixed stop on the other. This technique can be used to predetermine almost any number of rotations. However, this system is not well suited for use on a pre-installed steering shaft. It would present problems in installing a gear over the shaft, and it would require suitable differential gears for each different selected steering angle. These limitations cause this system to be poorly suited for use on different vehicles and for variable steering angles. U.S. Pat. No. 5,239,490 to Masaki et al. shows a computerized electronic apparatus for precisely detecting the rotation of a steering wheel and steering shaft. The apparatus employs a microprocessor to analyze the detected signals and operate an electronic power steering system or other rotating device. This system is applied for the purpose of controlling rotation in response to inputs, rather than to limit rotation. Nevertheless, changing this mode of operation may be possible. This patent is an example of a computerized steering system, mentioned above. The chief important limitations are high cost, difficult or impossible adaptability to different vehicles, and lack of suitability for use when a test driver is controlling the vehicle.

U.S. Pat. No. 3,055,235 to Turley shows a planetary gear system that provides indexing motion through a specified arc. This patent shows general background. As evident from the scope of the prior art, suitable devices of the desired kind are unknown. While several mechanisms perform a related function, they are not sufficiently versatile in their applications and structures to be adapted for mounting on the steering system of substantially any test vehicle. As a result, the need to provide a positive and variable rotation lock for dynamically testing substantially any selected vehicle is not reasonably met.

To achieve the foregoing and other objects and in accordance with the purpose of the present invention, as embodied and broadly described herein, the method and apparatus of this invention may comprise the following.

SUMMARY OF INVENTION

Against the described background, it is therefore a general object of the invention to provide an apparatus and method for limiting the rotation of a shaft to a variably pre-selected arc, which may be within two rotations in either direction.

According to the invention, an apparatus limits the arc of rotation of an axially elongated rod about its longitudinal axis. A stop assembly is mounted on the elongated rod for rotation with the rod. The stop assembly defines a stop assembly pathway around the rod. First and second pivot arms positioned in juxtaposition to the stop assembly, with either one of pivot arms extending into an interference position within the stop assembly pathway. The other pivot arm is displaced from interference with the stop assembly pathway. A linking mechanism interconnects the first and second pivot arms and responds to a pivot arm being displaced from interference with the stop assembly pathway by moving the other pivot arm into an interference position in the stop assembly pathway. Each pivot arm is structured and arranged such that it can be struck in either rotational direction when in interference position in the stop assembly pathway. Further, if struck in one direction, the pivot arm brakes the stop assembly; and if struck in the other direction, the pivot arm is displaced from interference position in the stop assembly pathway. Each of the two pivot arm reacts oppositely from the other to being struck in each direction of rotation. The pivot arms are linked in such a way that when either pivot arm is displaced from interference position in the stop assembly pathway, it causes the other pivot art to enter interference position in the stop assembly pathway.

According to a method of the invention, first a pair of stops are mounted on an axially elongated rod that is rotatable about its longitudinal axis. This mounting establishing a stop pathway that will be occupied by the pair of stop during rotation of the rod. Second, a pair of first and second pivot arms are mounted in a position juxtaposed to the pair of stops. The pivot arms are linked to be alternately pivotable into and out of an interference position with the stop pathway. Further, the pair of pivot arms is positioned such that: (a) the first pivot arm brakes the rod when one of the stops strikes the first pivot arm in a first rotational direction; (b) the second pivot arm brakes the rod when one of the stops strikes the second pivot arm in a second rotational direction; (c) the first pivot arm is displaced out of the interference position and the second pivot arm is moved into the interference position when one of said stops strikes the first pivot arm in the second rotational direction; and (d) the second pivot arm is displaced out of the interference position and the first pivot arm is moved into the interference position when one of the stops strikes the second pivot arm in the first rotational direction. Third, a selected one of the first and second pivot arms is positioned in the interference position. Fourth, the rod is rotated in a direction selected from the first and second rotational directions until one of the stops strikes one of the pivot arms in a direction such that the pivot arm brakes the rod, thus limiting the arc of rotation of the rod.

The accompanying drawings, which are incorporated in and form a part of the specification, illustrates preferred embodiments of the present invention, and together with the description, serves to explain the principles of the invention. In the drawings:

DETAILED DESCRIPTION

Figure 1:
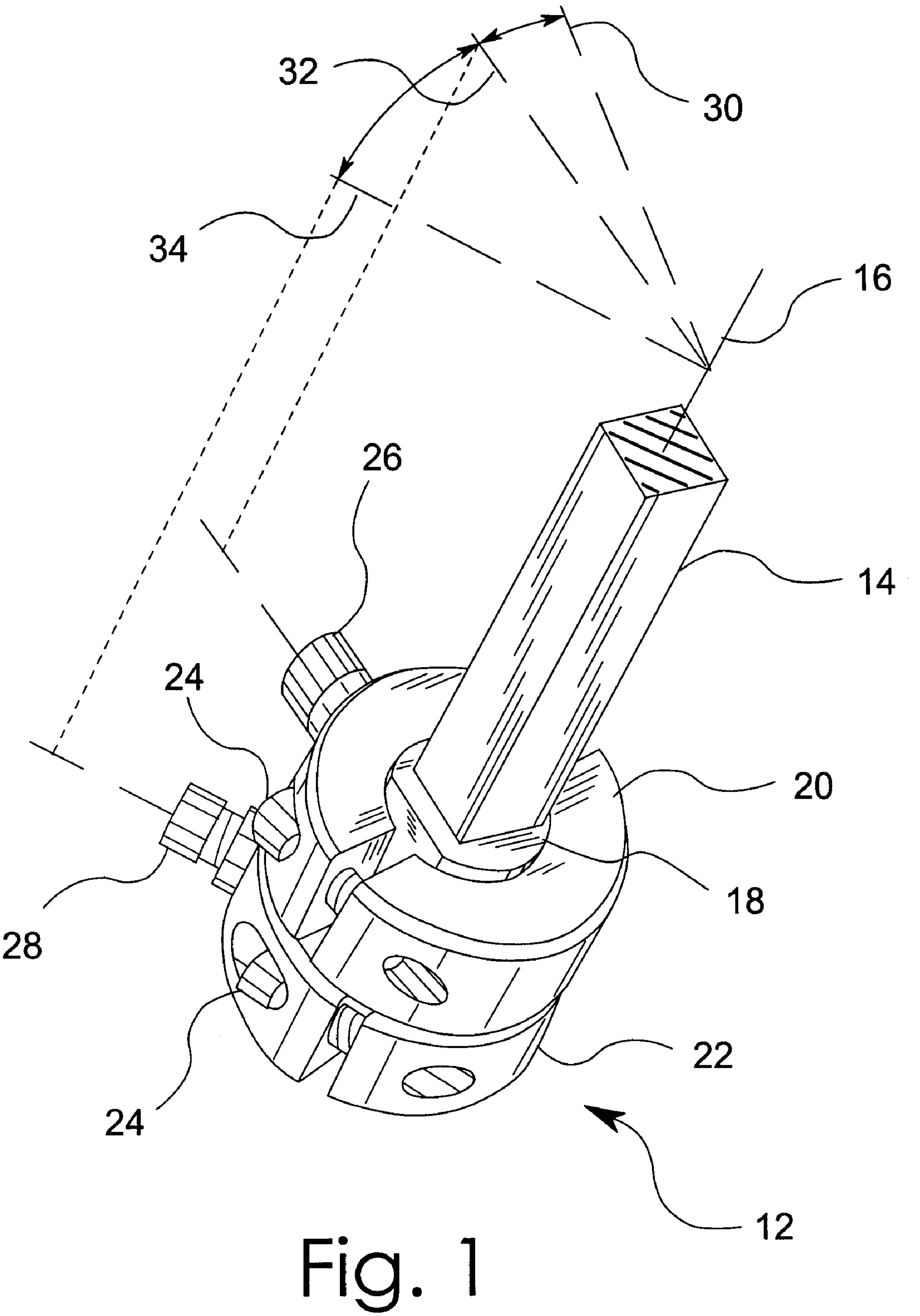
FIG. 1 is an isometric view of a stop assembly, forming a part of the invention.

The invention provides an apparatus and method for limiting the rotation of a rod, wheel, or shaft, especially the steering wheel shaft of a vehicle. It is a rotation limiter that is generally applicable to any type of rod that rotates on a longitudinal axis. The invention provides a variability in preselected degree of permitted rotation, up to about two rotations. At the end of the preselected arc, the rotation limiter provides a positive limit or stop in the direction of rotation, while permitting reverse rotation for the rod to back away from the limit or stop.

One advantage is easy adjustability. The rotation limiting device 10 can be adjusted empirically, for example by turning a steering wheel to the desired stop point. The mechanism can be secured in place at a selected stop point, which then is a repeatable stop point in subsequent rotations of the rod. After setting the stop point, the steering wheel can be turned in reverse to reach a starting point or the device 10 can be to physically re-set to the starting configuration. Steering in the reverse direction from the starting point also is possible. The shaft can be rotated first in one direction and then in another. This is a particular aid when test driving a vehicle, where it may be necessary to steer from side-to-side before performing the final step of a test involving a steering limitation.

Another advantage is wide applicability. The rotation limiting device 10 is compact and can be applied to many different vehicles. A stop assembly portion 12 clamps to the steering wheel shaft, which tends to be exposed near the floor panel of a vehicle. A pivot arm portion 36 bolts to the floor panel, juxtaposed to the steering wheel shaft. Because vehicles have several foot pedals in this locality, sufficient floor panel area tends to be available to receive the pivot arm portion 36.

The rotation limiting device 10 can be viewed as a directional braking apparatus applicable to a wheel or shaft, for applying a positive lock in one direction after permitting movement through a limited arc or angle of rotation. This device allows a shaft to rotate by a selectable angle that can range up to two revolutions with respect to a reference point, after which the shaft is positively stopped. The reference point can be arbitrary, but a convenient reference point is a neutral or midpoint position of a shaft that rotates between functional limits. For example, the steering shaft of a vehicle rotates through a defined arc, clockwise or counterclockwise, between the available steering limits of the vehicle. Thus, a neutral or straight ahead steering position is a suitable reference point or zero index position. Another view is that the reference point is the floor panel of a vehicle, which serves as a stationary reference for comparison to the rotating steering shaft. The chief purpose is to add certainty to dynamic automotive testing in which steering wheel rotation is to be limited to a selected arc.

The best mode of this invention employs first and second adjustable collars 20, 22 mounted on a single steering shaft 14. Each collar carries a radial stop, such as a radial screw or bolt that extends outwardly from the collar. The collars are individually adjustable and can be set to create any desired angular relationship between the two stops, which variably determines the permitted arc of steering wheel rotation. Both stops are secured to the shaft and rotate together with the shaft. However, each stop is at a separate axial position on the shaft so that each stop rotates in a separate annular stop pathway.

Each collar is aligned or associated with a separate pivot arm that can move into or out of an interference position with the path of a respective associated stop. Thus, the first of two pivot arms is aligned with the path of only one of the two stops, while the second pivot arm is aligned with the path of the second stop. The pivot arms are linked such that when one is in the path of its respective stop, the other is not. Further, in a first direction of rotation, one stop will bump its pivot arm out of the stop's path and move the opposite pivot arm into the path of its respective stop. If a stop strikes its pivot arm from the opposite direction of rotation, the stop lodges against the pivot arm and positively stops the shaft from further rotation in that direction. The pivot arms are oppositely arranged such that, in a single selected direction of shaft rotation, one of the pivot arms can be bumped away, but the other pivot arm cannot and, if contacted, will lodge its stop. Thus, the first stop on the first collar can rotate freely with the first collar in the first direction by bumping its pivot arm away from the collar on every revolution. In response to being bumped away, the first pivot arm moves the second pivot arm into the path of the second stop. The second pivot arm then is in a positional relationship, as long as the rod continues to rotate in the first direction, to lodge the second stop and positively stop the shaft from rotating in the first direction. Thus, the position of the second collar with respect to the first determines the variable permitted revolution, up to about two turns.

One portion of the rotation limiting device 10 is the stop assembly 12, shown in FIG. 1. A typical steering shaft or other rod is represented by the square shaft 14. This shaft is longitudinally elongated and may be viewed as having a longitudinal axis 16, shown in FIG. 1, lying along a centerline position in shaft 14.

In the illustration, shaft 14 enters a fitting 18 near its lower end. This fitting 18 is shown in FIG. 1 as a suitable alternative mount for the stop assembly 12 and may be regarded as a part of the shaft 14 or as an equivalent. The stop assembly may be mounted on the shaft 14, on a structure associated with shaft 14 such that it rotates with shaft 14, or on a size adapter or fitting that permits the stop assembly to fit a variety of shaft shapes or dimensions. Throughout the description and claims, reference to the shaft will include all of these described mounting variations and structures.

Two split collars 20, 22 are attached to the shaft 14. The first split collar 20 may be regarded as the upper collar, in that it is mounted at a higher position on axis 16 in the view of FIG. 1. Correspondingly, the second split collar 22 may be regarded as the lower collar, in that it is mounted at a lower position with respect to axis 16. Each collar is split, such as into two halves. The halves can be separated for easy installation onto a shaft at any point along the shaft length.

Connecting bolts 24 join the halves together and allow a collar to fit a range of shaft sizes. As suggested by fitting 18, the size of the shaft may be adjusted by adding fittings, spacers, or shims to aid in obtaining a snug fit between a collar and shaft. Loosening the connecting bolts 24 allows the collars to be adjusted axially and rotationally with respect to the shaft 14. Tightening the connecting bolts 24 secures the collar to the shaft so that the collar and shaft are in a fixed relationship wherein both move and stop in unison.

The stop assembly 12 includes one or more stops 26, 28. The former will be referred to as the upper or first stop, on the first or upper collar 20. The latter will be referred to as the lower or second stop, on the second or lower collar 22. The stops 26, 28 extend from the respective collars by a suitable distance and in suitable locations to interact with various followers, pivot arms, or swing arms, described below. In the drawings, the stops are shown to extend radially from the collars 20, 22. If suitable or desired, the stops may extend axially or in any other orientation from a collar.

The stop assembly 12 is easily fixed to a shaft, easily removed, and easily adjusted, both axially and rotationally. In the illustrated embodiment, all adjustments are accomplished with the connecting bolts 24. There are three adjustments of significance. First, the bolts 24 enable a collar to be applied or removed from a shaft. Second, the bolts 24 allow either collar to be rotated with respect to the shaft or to the other collar, to position the stops 26, 28 in any desired rotational position or to establish any desired included angle between the stops. Third, the bolts allow the included angle between two stops to be positioned with respect to an index position of the shaft, by shifting both collars in unison.

An index position may be chosen arbitrarily or functionally. FIG. 1 shows an example of various positions and angles. Index line 30 represents an arbitrary index position, which may functionally represent a straight-ahead position of a steering system. Relative to index position 30, the first stop 26 on first collar 20 extends at angular position 32 and second stop 28 on second collar 22 extends at angular position 34. The angle 32–34 may be referred to as the included angle between the stops, or the stop angle. This included angle establishes how the stops will interact with the pivot arms. The angle 32–34 may be rotationally offset from index position 30, defining an index angle 30–32. This offset establishes how the stops will interact with the vehicle or other external structure. Both the stop angle and the index angle are selected and adjusted by fixing the collars 20, 22 in suitable positions on shaft 14. The collars simplify and expedite the use of the rotation limiter. Stops 26, 28 could be employed without the collars, by substituting other clamps or supports for the stops, or by mounting the stops directly into the shaft 14. Regardless of how the stops are mounted, the stops rotate with shaft 14. Each stop defines an annular stop pathway in a ring around shaft 14. Because each collar is axially offset from the other, the stop pathway is formed of similarly offset rings. Together, the annular stop pathways may be referred to as a stop assembly pathway. The pathway defines an annular volume around shaft 14 where the stops can interact with additional components of the rotation limiter.

A pivot arm or swing arm system 36 defines another, co-operative part of the invention that alternately moves either of two swing arms into an interference position with the stop assembly pathway. This system provides a first swing arm or pivot arm 38, for example the pivot arm on the right in the arrangement of FIG. 2. The system also provides a second swing arm or pivot arm 40, for example the pivot arm on the left in the arrangement of FIG. 2. The two pivot arms are mounted in axially offset positions with respect to the axis 16. The two pivot arms also are mounted with transversely offset spacing with respect to shaft axis 16. Each pivot arm is aligned with a stop 26 or 28, which will be referred to as the respective associated stop, and its stop pathway will be referred to as the associated stop pathway.

The pivot arms 38, 40 are mounted on pivot axes, such as the longitudinal axes of respective pivot bolts 42, 43. The pivot axes are near a distal end of the pivot arms, positioned remotely from the shaft 14. The opposite proximal or free end of the pivot arms is positioned nearer the shaft 14. The axes of the pivots are preferred to lie approximately parallel to axis 16.

A linking means interconnects the two pivot arms at a position offset from the pivot bolts so that the pivot arms must pivot in unison on the pivot axes. A suitable linking system is a rod 44 jointed to each pivot arm by a rod ball end 46. The resulting range of motion suggested by the arrows 48 shows a swing angle between the positions of arm 38 and phantom swing arm 38', as well as between the positions of swing arm 40 and phantom swing arm 40'. The pivot range or swing angle is sufficient to bring the free end of either pivot arm into and out of the associated stop pathway.

Figure 3:
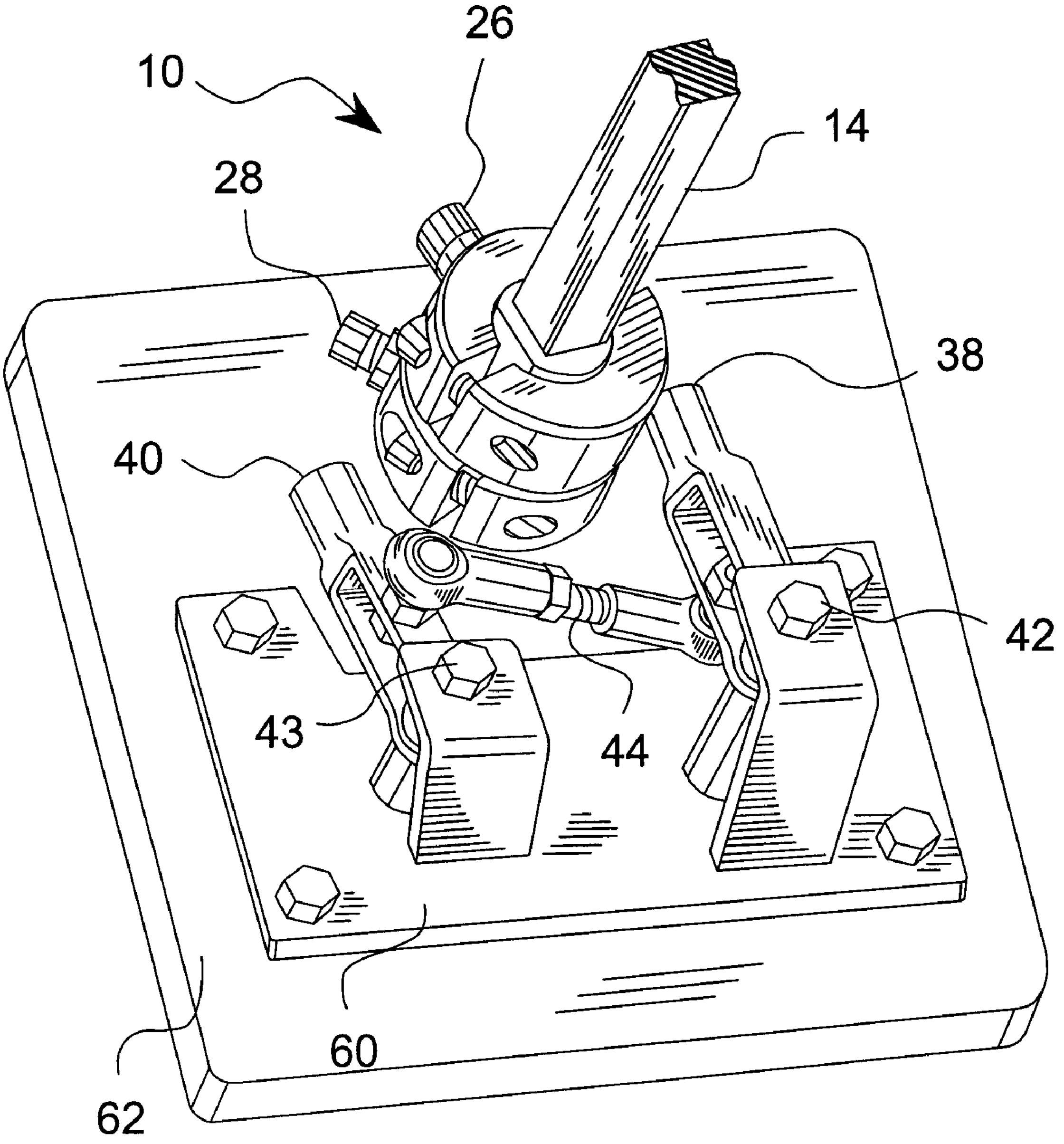
FIG. 3 is an isometric view of the stop assembly and pivot arm assembly placed in operational relationship and installed.

The axial offset of pivot arms 38, 40 allows each pivot arm to interact only with an associated stop at its own axial height. One of the pivot arms, such as right hand pivot arm 38 of FIG. 3, is axially higher and interacts with the axially higher stop 26 within its stop pathway. The other pivot arm, such as left-hand pivot arm 40, is axially lower and interacts with the axially lower stop 28 within its stop pathway.

Figure 2:
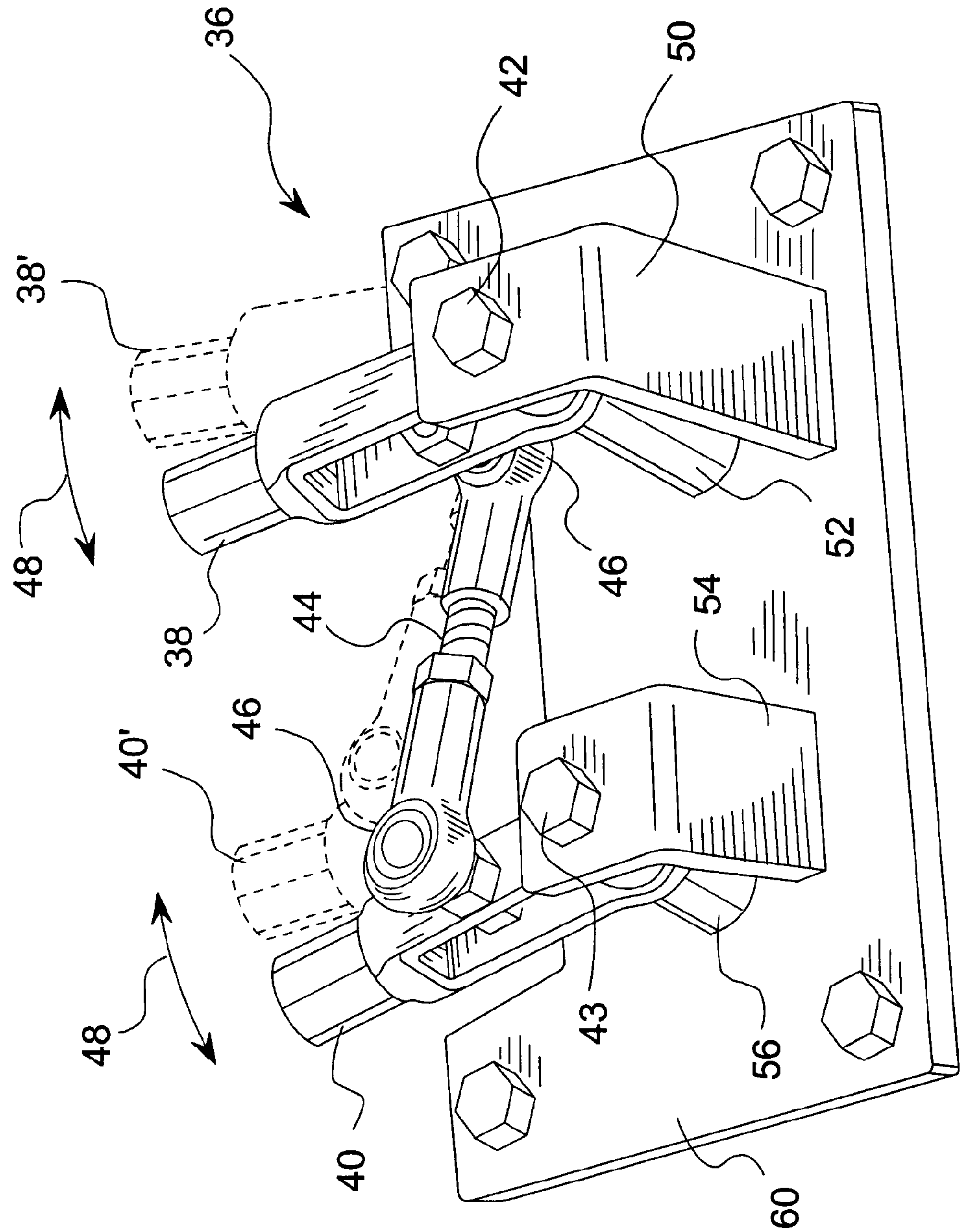
FIG. 2 is an isometric view of a pivot arm assembly, forming another part of the invention.

In FIG. 2, the right hand pivot arm 38 is mounted with a relatively tall bracket 50 over a relatively tall spacer 52. Similarly, the left hand pivot arm 40 is mounted with a relatively short bracket 54 over a relatively short spacer 56. These taller and shorter dimensions are relative to positions along axis 16. In addition, the brackets and spacers may be carried on a base plate 60 that provides another relative reference for heights.

The base plate 60 is suited to mount the pivot arm system 36 in suitable proximity to the stop assembly 12. FIG. 3 best shows the relationships of the components. The base plate 60 is bolted to a floor panel 62 or other similar structure of a vehicle or structure external of shaft 14 and stop system 12. A floor panel 62 often is transverse to a steering shaft 14 and is penetrated by the steering shaft. The base plate 60 is mounted to floor panel 62 in juxta-position to the steering shaft 14. Thus, the panel 62 unifies the components in a functional relationship.

In addition to having axial coordination with an associated stop, each pivot arm also is disposed laterally with respect to the steering shaft and collars to dynamically interact with the associated stop in a unique way. In the view of FIG. 3, the pivot axes of arms 38, 40 are forward of the shaft 14. From this perspective, right hand pivot arm 38 lies generally on the right side of the shaft 14 and collar 22, while left hand pivot arm 40 generally lies on the left side of shaft 14 and collar 20. Thus, the shaft and collars may be regarded as lying between the free ends of the pivot arms 38, 40. This position enables each pivot arm and its associated stop 26, 28 to interact differently, depending upon which way shaft 14 rotates. For example, a stop 26, 28 rotating clockwise and encountering the free end of its associated pivot arm 38, 40 in an interference position on the right side of the shaft 14 will tend to strike the pivot arm axially, on its free end, and be braked to a halt, in turn stopping the clockwise rotation of the shaft. Instead, if the same stop 26, 28 rotates counterclockwise and strikes the associated pivot arm from the opposite direction, the stop 26, 28 will strike an intermediate point in the length of the pivot arm, transversely striking the axis of the pivot arm. In the latter case, the stop 26, 28 will displace the pivot arm 38, 40 from its interference position in the stop pathway.

The pivot arm 40 on the left side of shaft 14 interacts with associated stop 28 and reacts oppositely. Under counterclockwise rotation with stop 28 in an interference position with the stop pathway, stop 28 will axially strike pivot arm 40 and be braked. Under clockwise rotation, stop 28 will strike pivot arm 40 transversely and will displace the free end of the pivot arm from the stop pathway.

In a preferred embodiment, the stops 26, 28 are variably positionable screws or bolts. Alternative structures could employ custom sized and configured stops, including single stops wide enough to define any desired stop angle and tall enough to react with pivot arms spaced at different axial heights. Thus, the individual stops 26, 28, by their ability to be set at selected stop angles, can be regarded as or equated to single stops of variable preselected size, forming a stop assembly of preselected variable size. A stop assembly formed of either a plurality of individual stops or of a single, custom configured stop, functions similarly and moves with the rotating shaft 14 in either rotational direction.

The first and second pivot arms 38, 40 are selected and arranged to have suitable size, spacing, and position that either pivot arm can enter an associated stop pathway while displacing the other pivot arm from the other associated stop pathway. The linking mechanism 44 operates between the pivot arms 38, 40 to coordinate the respective motions. The linking mechanism serves as a means for responding to the displacement of either pivot arm from its associated stop assembly pathway by moving the other pivot arm into its respective associated stop pathway.

EXAMPLE 1

A pivot arm can be placed in an initial position to pre-arrange its performance. For example, the higher pivot arm 38 may be initially placed in the stop assembly pathway. Then, if the shaft rotates clockwise, the associated stop 26 will strike pivot arm 38 within one revolution and brake the shaft 14, regardless of how the lower stop 28 is positioned. Thus, only a single stop and pivot arm are required to brake a shaft within one revolution, from a single direction of rotation. The lower pivot arm 40 and stop 28 would perform equivalently to stop counterclockwise rotation within one revolution.

EXAMPLE 2

The initial arrangement described in Example 1 can be varied by rotating the shaft counterclockwise. The associated stop 26 will bump the pivot arm 38 out of the stop assembly pathway within one counterclockwise revolution. In response, linking rod 44 will draw the lower pivot arm 40 into the stop assembly pathway, specifically into the pathway for lower stop 28. Depending on the stop angle 32–34, the lower stop 28 will axially strike lower pivot arm 40 at any counterclockwise rotational position from about one revolution to about two revolutions. Thus, the pivot arm system 36 can be preset to allow about two revolutions of shaft 14 in one direction before braking the shaft. Since either pivot arm can be pre-positioned in the stop assembly pathway, two rotations in either direction are obtainable by suitable selection of which pivot arm to pre-position.

EXAMPLE 3

The initial arrangement of Examples 1 or 2 can be varied to stop rotation with a predisposition toward one direction of rotation. For example, a land vehicle may be tested for up to one or two revolutions of the steering wheel, but while the vehicle initially is rounding a corner or following a curve. In this case, the index angle is considered, to allow the steering shaft to be pre-positioned as required to follow the corner or curve. Hence, for example, the steering wheel may be pre-positioned one-quarter revolution clockwise. The collars 20, 22 are loosened and shifted counterclockwise by the same index angle, namely ninety degrees, and secured. Thereafter, the steering wheel can be rotated by the desired number of rotations, up to about two rotations, but starting from a bias position one-quarter turn to the right. Coordinating the direction of rotation, the pre-selection of which pivot arm to position in the stop assembly pathway, the stop angle, and the index angle can produce widely varying results to suit different testing requirements.

The rotation limiting device 10 is generally described, above. It may be regarded as a device, assembly, or kit that is suited to be installed on a selected vehicle or other application. In another embodiment, the invention may be regarded as a vehicle or other application that includes the rotation limiting device 10 as a component.

The method of operation of the rotation limiting device is another aspect of the invention. While the overall operation is described above and in the examples, certain aspects of operation are especially notable.

A first step of the method is to position and mount a pair of stops on an axially elongated rod that is rotatable about its longitudinal axis. This mounting establishing a stop pathway that will be occupied by the pair of stop during rotation of the rod. The stops may be mounted on the rod by securing a stop assembly 12 onto the rod 14. The stop pathway may be equivalent to a stop assembly pathway discussed above. The stop assembly is moveable through the stop assembly pathway with rotation of the rod 14 in either of the opposite, first or second rotational directions, such as clockwise or counterclockwise directions.

Second, a pair of first and second pivot arms are mounted in a position juxtaposed to the pair of stops. The pivot arms are linked to be alternately pivotable into and out of an interference position with the stop pathway. Further, the pair of pivot arms is positioned such that: (a) the first pivot arm brakes the rod when one of the stops strikes the first pivot arm in a first rotational direction; (b) the second pivot arm brakes the rod when one of the stops strikes the second pivot arm in a second rotational direction; (c) the first pivot arm is displaced out of the interference position and the second pivot arm is moved into the interference position when one of said stops strikes the first pivot arm in the second rotational direction; and (d) the second pivot arm is displaced out of the interference position and the first pivot arm is moved into the interference position when one of the stops strikes the second pivot arm in the first rotational direction.

A suitable arrangement of the pivot arms has been described previously and illustrated in the drawings. The first pivot arm may be pivot arm 38, pivotable on a pivot axis such as the axis of a pivot bolt 42. The pivot arm 38 is positioned to be pivotable into and out of an interference relationship with the stop assembly pathway. Further, when in interference position, the pivot arm 38 is positioned such that when the stop assembly 12 strikes it in a first or clockwise rotational direction, the pivot arm 38 brakes the stop assembly 12. When the stop assembly 12 strikes the first pivot arm 38 in the opposite or clockwise rotational direction, the stop assembly 12 displaces the first pivot arm from interference position in the stop assembly pathway.

The second pivot arm 40 is pivotally carried on a the pivot axis of bolt 43. The pivot arm 40 is positioned for movement into and out of an interference position with the stop assembly pathway. The second pivot arm 40 is linked to the first pivot arm 38 for common movement, such that when the first pivot arm 38 is displaced from interference position in the stop assembly pathway, the second pivot arm 40 is shifted into interference position in the stop assembly pathway. When the stop assembly 12 strikes the second pivot arm 40 in the second rotational direction, pivot arm 40 brakes the stop assembly 12.

Third, a selected one of the first and second pivot arms is positioned in the interference position. A selected one of the pivot arms 38, 40 is placed in an interference position in the stop assembly pathway.

A fourth step of the method is to rotate the rod in a direction selected from the first and second rotational directions until one of the stops strikes one of the pivot arms in a direction such that the pivot arm brakes the rod, thus limiting the arc of rotation of the rod. Rod 14 is rotated in clockwise or counterclockwise direction sufficiently far that the stop assembly strikes one of the pivot arms in interference position. In turn, the pivot arm brakes the stop assembly and limits the arc of rotation of the rod 14. This final step contemplates that as long as either pivot arm is in interference position at some point in the method, eventually the continued rotation of the shaft 14 in one direction will cause the stop assembly to be braked. Two rotations is approximately the maximum allowed rotation in a single direction, after which braking will occur.

The forgoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

The invention claimed is:

1. An apparatus limiting the arc of rotation of an axially elongated rod about its longitudinal axis in either of opposite rotational directions, comprising:

an adjustable stop assembly, useable with an axially elongated rod that is rotatable about its longitudinal axis, mountable for rotation with the rod, and establishing a stop assembly pathway about the longitudinal axis of the rod, said ston assembly formed of first and second collars coaxially mountable on the rod at separate axial heights; a first ston carried by said first collar and, when the first collar is mounted on the rod, moveable with the first collar in a first annular oath around the longitudinal axis of the rod; and a second stop carried by said second collar and, when the second collar is mounted on the rod, moveable with the second collar in a second annular oath around the longitudinal axis of the rod;

first and second pivot arms, juxtaposed to said stop assembly, positioned with either one of said pivot arms extending into an interference position with said stop assembly pathway such that the adjustable stop assembly will strike the interfering pivot arm in one of the opposite rotational directions, and positioned with the other pivot arm displaced from the interference position; and a mechanism for linking the first and second pivot arms for common movement and moving either pivot arm into the interference position when the other pivot arm exits the interference position;

wherein, when in the interference position, each pivot arm is positioned to respond to being struck by said stop assembly from a one of the rotational directions by braking the stop assembly and to respond to being struck by the stop assembly from the opposite rotational direction by exiting the interference position;

wherein the first and second pivot arms respond mutually oppositely to being struck in the respective opposite rotational directions; and whereby the arc of rotation of the rod about its longitudinal axis in one of the rotational directions is limited by one of the pivot arms braking the stop assembly in response to the stop assembly striking the pivot arm in the one rotational direction.

2. The apparatus of claim 1, wherein said first and second collars are split collars.

3. The apparatus of claim 1, wherein said stop assembly further comprises:

means for variably establishing an angle between said first and second stops to establish a preselected included angle when the collars are positioned coaxially on the rod.

4. The apparatus of claim 3, wherein said means for variably establishing an angle between said first and second stops comprises:

means for adjusting the rotational position of at least one of said first and second collars with respect to the other.

5. The apparatus of claim 3, wherein said means for variably positioning the first and second stops about the longitudinal axis of the rod comprises:

means for adjusting the rotational position of both of said first and second collars with respect to the rod.

6. The apparatus of claim 3, wherein said stop assembly further comprises:

means for variably positioning the first and second stops about the longitudinal axis of the rod, when the collars are positioned on the rod, to dispose said included angle at a preselected angle offset with respect to a selected index position of the rod.

7. The apparatus of claim 6, wherein said first pivot arm is aligned with the first stop, such that the first pivot arm is selectively moveable into and out of interference position with said first annular path of the first stop, and such that when positioned in said interference position, the first pivot arm can be struck by the first stop in either of two rotational directions, a strike in one of the directions causing the first pivot arm to exit the interference position with the first annular path, and a strike in the second direction braking the first stop.

8. The apparatus of claim 7, wherein said second pivot arm is aligned with the second stop, such that the second pivot arm is selectively moveable into and out of an interference position with said second annular path of the second stop, and such that when positioned in said interference position, the second pivot arm can be struck by the second stop in either of two rotational directions, a strike in one of the directions causing the second pivot arm to exit interference position with the second annular path, and a strike in the second direction braking the second stop.

9. The apparatus of claim 8, wherein said first and second pivot arms are positionable at offset axial positions with respect to the axis of the rod such that the first pivot arm is mountable at the axial height of said first collar and the second pivot arm is mountable at the axial height of said second collar.

10. The apparatus of claim 9, wherein said first and second pivot arms are carried on a common base.

11. The apparatus of claim 9, wherein said rod is a steering shaft of a vehicle having a floor; and said common base is mountable to the floor of the vehicle.

12. In a vehicle having an axially elongated steering shaft that is rotatable about its longitudinal axis, an apparatus selectively limiting the available arc of rotation of the steering shaft about its longitudinal axis, comprising:

a variably positionable and variably sizeable stop assembly carried on said steering shaft, establishing a stop assembly pathway about the longitudinal axis of the steering shaft through which the stop assembly is moveable with rotation of the steering shaft in opposite first and second rotational directions, said ston assembly formed of first and second collars coaxially mounted on said steering shaft at relatively offset axial positions; a first ston carried by said first collar and moveable with the first collar in a first annular path around the longitudinal axis of the steering shaft; and a second ston carried by said second collar and moveable with the second collar in a second annular path around the longitudinal axis of the steering shaft;

first and second pivot arms variably positioned such that either selected pivot arm is in the stop assembly pathway and the other pivot arm is displaced from the stop assembly pathway; and a linking mechanism between the first and second pivot arms, responding to either pivot arm being displaced from the stop assembly pathway by moving the other pivot arm into the stop assembly pathway;

wherein the first pivot arm is structured such that if the stop assembly strikes the first pivot arm in the stop assembly pathway in the first direction of rotation, the stop assembly engages the first pivot arm in a braking relationship, and if the stop assembly strikes the first pivot arm in the second direction of rotation, the stop assembly displaces the first pivot arm from the stop assembly pathway; and wherein the second pivot arm is structured such that if the stop assembly strikes the second pivot arm in the stop assembly pathway in the second direction of rotation, the stop assembly engages the second pivot arm in a braking relationship, and if the stop assembly strikes the second pivot arm in the first direction of rotation, the stop assembly displaces the second pivot arm from the stop assembly pathway;

whereby the rotation of the steering shaft about its longitudinal axis in one of the two rotational directions is limited by the stop assembly engaging at least one of the two pivot arms in a braking relationship.

13. The apparatus of claim 12, wherein said first and second collars are split collars having a means for securely fastening the collars to a shaft.

14. The apparatus of claim 13, wherein said stop assembly further comprises:

means for variably establishing an angle between said first and second stops, establishing a preselected included angle.

15. The apparatus of claim 14, wherein said means for variably establishing an angle between said first and second stops comprises:

means for adjusting the rotational position of at least one of said first and second collars with respect to the other.

16. The apparatus of claim 14, wherein said means for variably positioning the first and second stops about the longitudinal axis of the steering shaft comprises:

means for adjusting the rotational position of both of said first and second collars with respect to the steering shaft.

17. The apparatus of claim 14, wherein said stop assembly further comprises:

means for variably positioning the first and second stops about the longitudinal axis of the steering shaft, disposing said included angle at a preselected angle offset with respect to a selected index position of the steering shaft.

18. The apparatus of claim 17, wherein said first pivot arm is positionally and directionally associated with the first stop, such that the first pivot arm is selectively moveable into and out of an interference position with said first annular path of the first stop, and such that when positioned in said interference position, the first pivot arm can be struck by the first stop in either of two rotational directions, a strike in one of the directions causing the first pivot arm to move out of interference position with the first annular path, and a strike in the second direction braking the first stop.

19. The apparatus of claim 18, wherein said second pivot arm is positionally and directionally associated with the second stop, such that the second pivot arm is selectively moveable into and out of an interference position with said second annular path of the second stop, and such that when positioned in said interference position, the second pivot arm can be struck by the second stop in either of two rotational directions, a strike in one of the directions causing the second pivot arm to move out of interference position with the second annular path, and a strike in the second direction braking the second stop.

20. The apparatus of claim 19, wherein said first and second pivot arms are positionable at offset axial positions with respect to the longitudinal axis of the steering shaft such that the first pivot arm is mountable at the axial position of said first collar and the second pivot arm is mountable at the axial position of said second collar.

21. The apparatus of claim 20, wherein said first and second pivot arms are carried on a common base.

22. The apparatus of claim 20, wherein:

the vehicle includes a floor panel transverse to said steering shaft, penetrated by the steering shaft; and said common base is mounted to said floor panel in juxtaposition to said steering shaft.

* * * * *